United States Patent [19]

Snyder et al.

[11] 3,754,513

[45] Aug. 28, 1973

[54] SHOCK ABSORBING STOP FOR FIXED PATH VEHICLE

[75] Inventors: James H. Snyder; William E. Riedner, both of Battle Creek, Mich.

[73] Assignee: Clark Equipment Company, Buchanan, Mich.

[22] Filed: Dec. 8, 1971

[21] Appl. No.: 206,223

[52] U.S. Cl.............. 104/256, 105/392.5, 105/454, 213/8, 213/43
[51] Int. Cl.......................... B61k 7/18, B61g 11/12
[58] Field of Search.......................... 213/8, 43, 223; 104/249–256; 293/30; 105/392.5, 454; 214/16 B; 49/360; 160/187–189, 202, 224

[56] References Cited
UNITED STATES PATENTS

| | | | |
|---|---|---|---|
| 3,332,364 | 7/1967 | Smith | 105/454 |
| 3,334,757 | 8/1967 | Peterson | 105/454 |
| 745,582 | 12/1903 | Dittbenner | 104/256 |
| 821,524 | 5/1906 | McCormick | 104/256 |
| 1,084,463 | 1/1914 | McDonald | 104/256 |

*Primary Examiner*—Drayton E. Hoffman
*Attorney*—Kenneth C. Witt, Lewis J. Lamn et al.

[57] ABSTRACT

This is apparatus for positive stopping of a fixed path vehicle with a minimum of shock. The fixed path vehicle carries a pair of floating fluid type shock absorbers which are so located as to engage pairs of positive stops at each limit of travel of the vehicle to transmit a stopping force to the vehicle which is a function of vehicle velocity. The fluid shock absorbers are of the cylinder double-ended piston type in which restricted flow of fluid is permitted between the cavities on each side of the piston. The shock absorbing mechanism has a spring between the piston and cylinder biasing the piston into the extended position against fixed brackets on the vehicle. Fixed stops are mounted in the floor to limit the travel of the vehicle in each direction. When the vehicle travels in one direction into the stops, the piston end of the shock absorbing mechanism engages the stops while the cylinder end engages a bracket on the vehicle thereby transmitting force from the stop to the bracket, which force is a function of velocity. When the vehicle travels in the opposite direction against the stop at the other limit of travel, the cylinder engages the stop while the piston rod engages the opposite bracket on the vehicle thus transmitting force from the stop to the bracket which is a function of velocity of the vehicle. In this way, the same shock absorber is used for stopping the vehicle in both directions at the limit of travel. A pair of the shock absorbers may be mounted equidistant from the center of mass of the vehicle to exert the stopping force without excessive torque about an axis normal to the direction of travel of the vehicle.

8 Claims, 4 Drawing Figures

INVENTORS
JAMES H. SNYDER
WILLIAM E. RIEDNER
BY
*Lewis J. Lamm*
ATTORNEY

SHOCK ABSORBING STOP FOR FIXED PATH VEHICLE

BACKGROUND AND SUMMARY OF THE INVENTION

This invention relates to shock absorbing apparatus for stopping fixed path vehicles at predetermined limits of travel by exerting a force that is a function of velocity to thereby minimize stopping force exerted on the vehicle. In the present invention a single shock absorbing means is used for stopping the vehicle at both limits of travel. The cylinder-piston fluid shock absorber floats between two brackets on the vehicle and in one direction of travel the piston end engages the limit stop while the cylinder end engages the vehicle bracket and at the other limit of travel, the cylinder end engages the limit stop while the piston end engages the second bracket on the vehicle.

Previously one shock absorbing means has been used to stop the vehicle in one direction of travel, while a second and independent shock absorbing means has been used to stop the vehicle travel in the opposite direction of motion. In this prior art one end of the shock absorber is fixed to the vehicle while the other end engages the stop. This arrangement requires that individual shock absorbers be used for each limit of travel, thus necessitating the use of two shock absorbers rather than one. It is, therefore, an object of the present invention to provide a shock absorber for a fixed path vehicle which is effective in both directions of travel of the vehicle.

It is another object of the present invention to provide a cylinder-piston type shock absorber in which the cylinder end of the shock absorber engages a fixed stop to limit travel in one direction and the piston end of the shock absorber engages a fixed stop to limit travel in the opposite direction.

It is a further object of the present invention to provide a single control stop mechanism which will be effective to control deceleration rates at both ends of travel of the vehicle.

It is a further object of the present invention to provide an enclosed cylinder double-ended piston fluid shock absorber having a closed fluid circuit with restricted flow of fluid permitted between one side and the other of said piston and in which the piston end of the device engages a fixed stop to limit travel of a fixed path vehicle in one direction and the cylinder end of the device engages a second stop to limit travel of the vehicle in the other direction.

Further objects of the present invention will become apparent upon inspection of the drawings and specifications and will be pointed out in the claims.

BRIEF DESCRIPTION OF PREFERRED EMBODIMENT

Referring to the drawings.

Figure 1:
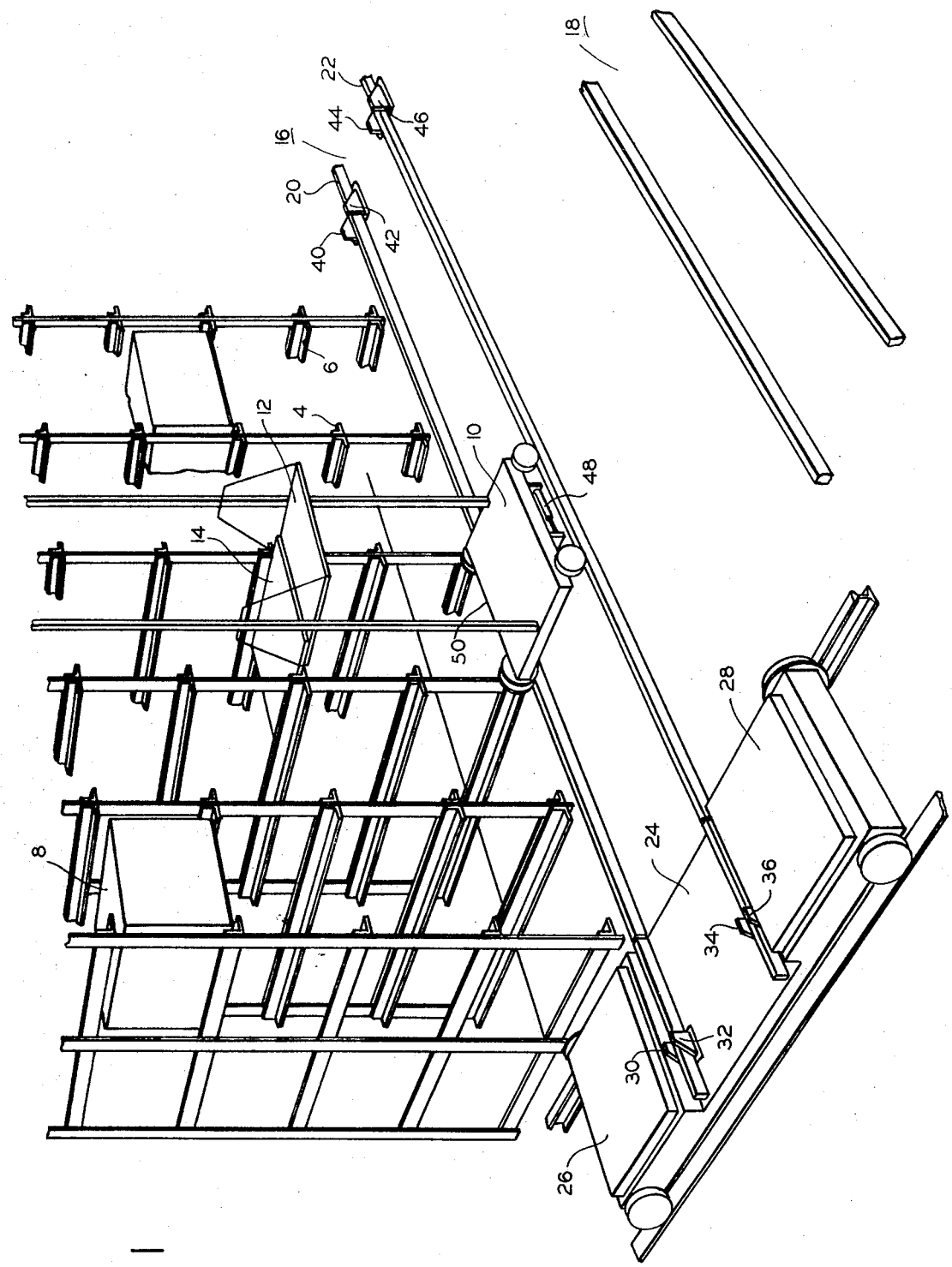
FIG. 1 is a schematic view showing an automatic storage system in which the stacker is a fixed path vehicle utilizing the present invention.

Referring more particularly to FIG. 1, the bin structure 2 has a series of pairs of angle supports 4 and 6 capable of receiving pallets 8 from a fixed path stacker vehicle 10 having an elevator 12 and a material handling lateral platform 14 which extends and retracts in and out of the bins formed by the angle iron supports 4 and 6.

The storage system includes a multiplicity of bins similar to 2 which are separated by aisles 16, 18, etc. which have pairs of rails 20–22 on which the stack 10 travels in the aisle. The stacker 10 may be transferred from aisle to aisle by a transfer cart 24 having loading stations 26 and 28 thereon. The rails 20 and 22 are extended onto the transfer cart 24 so that the stacker 10 may be driven onto the transfer cart. To limit the movement of the stacker onto the transfer cart, positive stops 30 and 32 are located on the transfer cart, one on each side of the extension of the rail 20, and stops 34 and 36 are similarly located, one on each side of the rail 22. The members 30 and 32 act as a single stop, as do the members 34 and 36 and, of course, each of these pairs in certain modifications of the invention may be combined as a single stop member. Stops 40 and 42 straddle the rail 20 and the stops 44 and 46 straddle the rail 22 to act as stops to limit the travel of the stacker in the direction away from the transfer cart. Here again 40 and 42 may be combined into a single stop and 44 and 46 may also be combined into a single stop, since their mounting is optional and each pair operates as single stops against a single cooperating shock absorber means.

The stacker 10 in the preferred embodiment of the present invention has two shock absorber means 48 and 50 (FIG. 1). One end of the shock absorber means 48 engages the stop 44–46, and one end of the shock absorber means 50 engages the stop 40–42, while the other end of the stops 48 and 50 engage the stacker to control the final deceleration rate as the stacker is stopped at its limit of travel. When the fixed path stacker vehicle 10 travels in the back direction toward the transfer cart, its limit of movement is controlled by the stops 30–32 and 34–36. In this direction of travel the opposite ends of the shock absorber devices 48 and 50 engage the fixed stop 30–32 and 34–36 to control the final rate of deceleration as the stacker reaches its limit of travel in that direction.

Figure 2:
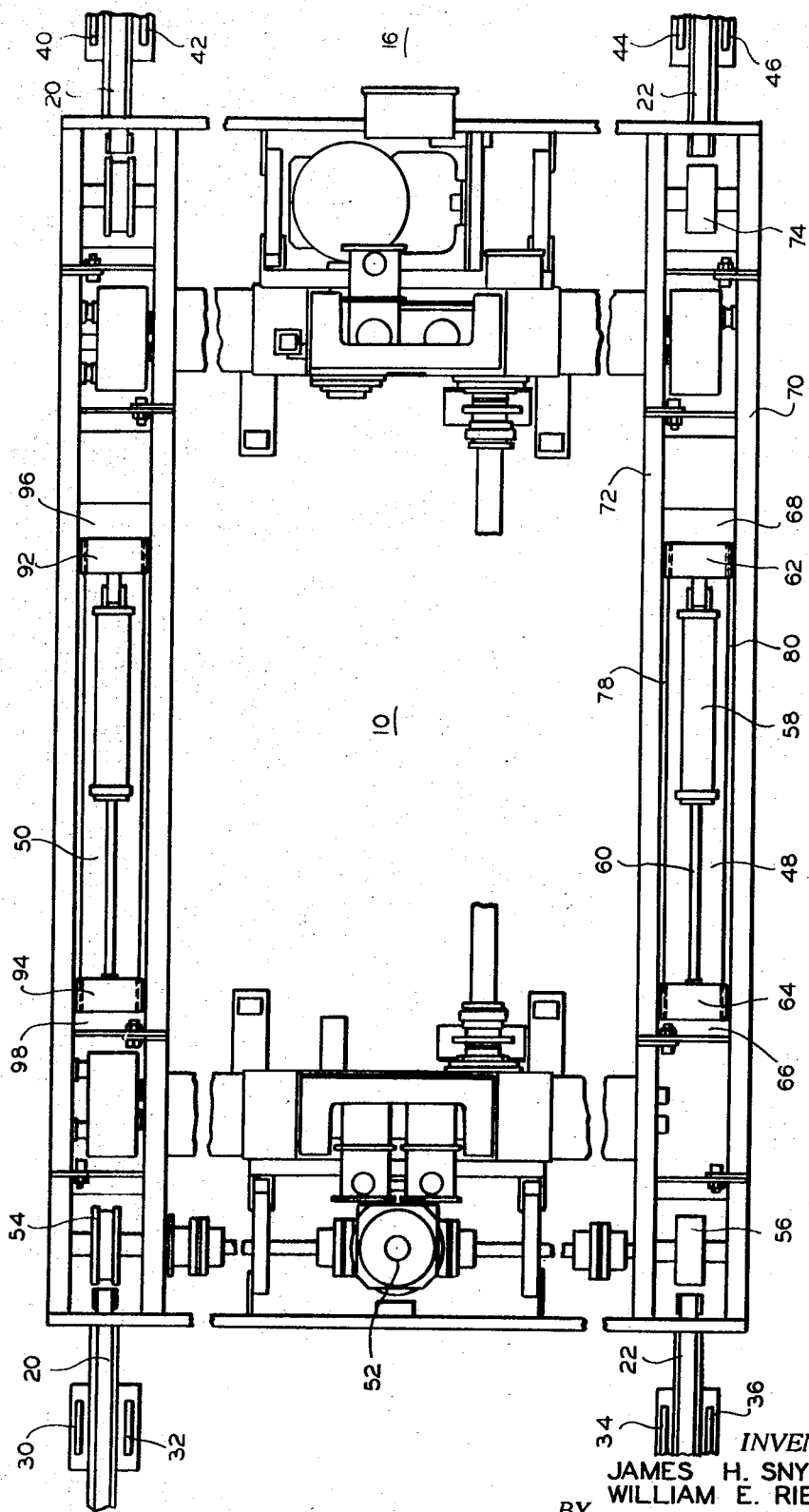
FIG. 2 is a plan view of the base of a stacker vehicle using the present invention.

Referring now to FIG. 2, the apparatus utilizing the present invention is shown in greater detail. In this figure the fixed path stacker vehicle 10 is driven by power means 52 through wheels 54 and 56 on rails 20 and 22 in two directions in the aisle 16. The shock absorbing means 48 and 50 are identical in construction and operation, and 48 will be described in detail.

Figure 3:
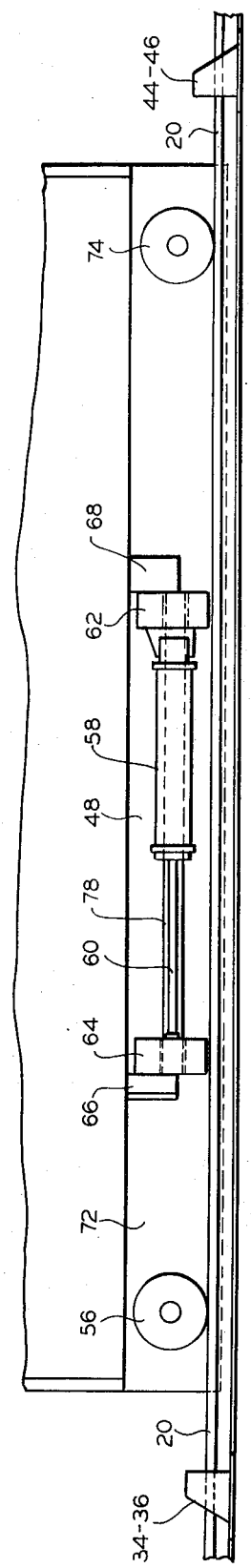
FIG. 3 is a vertical view of one side of FIG. 2 showing the present invention in greater detail.
Figure 4:
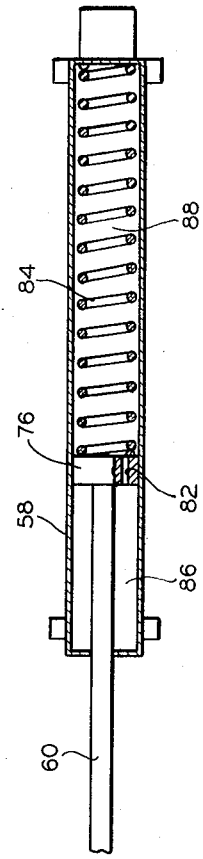
FIG. 4 is a cross-section of the shock absorber device used in one embodiment of the present invention.

Referring now to FIGS. 2, 3 and 4, the shock absorber mechanism 48 consists of a fluid cylinder 58 having a double-ended piston 76 therein with a restricted opening 82 therein to permit the flow of fluid between the piston rod end cylinder cavity 86 and the cylinder head end cavity 88. The compression spring 84 urges the piston 76 into the extended position. Attached to the piston rod 60 is an impact block 64 and attached to the cylinder 58 is an impact block 62. The spring 84 urges the piston 76 into the extended position thereby forcing the block 64 into engagement with the bracket 66 and the block 62 into engagement with the bracket 68, the brackets 66 and 68 are integral parts of the stacker and are welded to the side rails 70 and 72, which in turn are part of the stacker vehicle frame. Side rails 70 and 72 have guides 80 and 78, respectively, which carry the blocks 62 and 64 so that the shock absorber assembly floats between the brackets 66 and 68 and is held in place by the guides 78 and 80. The cavities 86 and 88 are filled with shock absorber fluid and this fluid is forced between the two cavities through the restricted opening 82 as the piston 76 moves in the cylinder 58 during its shock absorber action while stopping the fixed path stacker vehicle 10. The shock absorber fluid, the size of the cylinder 58, the size of the piston 76, the size of the opening 82 and the dimension of the spring 84 are all selected to give the proper deceleration rate for a particular weight vehicle.

If two or more shock absorber assemblies are used, such as illustrated in FIG. 2, they are normally so located and so designed as to give uniform deceleration rates at each assembly. If two are used of equal dimensions, they are normally placed an equidistance each side of the center of mass of the vehicle. (This is illustrated in FIG. 2.)

A single floating shock absorber assembly aligned with the vehicle center of mass may be used if the construction of the vehicle so permits.

OPERATION OF PREFERRED EMBODIMENT

In one preferred embodiment, the invention is used as illustrated in an automatic storage system environment. In this case the stops 30–32 and 34–36 are so located on the transfer car as to stop the stacker at the proper location on the transfer car for its transportation between aisles, (for example, transporting from aisle 16 to 18). The stops 40–42 and 44–46 are located at the end of the aisle opposite the transfer car to limit the travel of the stacker in that direction. Should the stacker 10 be driven down the rails 20 and 22 into these latter stops limiting travel, the members 62 and 92 would be driven into the stops 44–46 and 40–42, respectively. This would drive the members 62 and 92 away from the brackets 68 and 96, respectively, and urge the members 64 and 94 against the brackets 66 and 98, respectively.

Referring to the operation of the shock absorber 48 to which the shock absorber 50 is identical, and to FIGS. 3 and 4, it will be seen that as the member 62 leaves the bracket 68 the spring 84 is compressed, since the piston 76 is held from moving relative to the stacker 10 by member 64 abutting member 66. Oil is then forced from the cavity 88 into the cavity 86 through the restrictive opening 82. The rate of deceleration is controlled by the rate of flow of fluid through the opening 82, which rate of flow is dependent on the difference in fluid pressure in the cavity 88 over that in cavity 86. It may thus be seen that the deceleration forces may be limited to a magnitude determined by the design parameters of the stacker and the shock absorber mechanism. The energy absorbed by forcing the oil through the restricted opening 82 and the compression of the spring 84 gradually brings the stacker to a stop at which time the pressure between the chambers 86 and 88 are stabilized and equal. At this point the spring compression forces push the block 62 back toward the bracket 68 and thus moves the stacker in the reverse direction until member 62 is in contact with the limit stop 44–46 and the bracket 68, at which point there is no further movement.

When the stacker is moved in the reverse direction toward the transfer cart to the limit of its travel, the member 64 engages the stops 34–36 on the transfer cart and the shock absorbing mechanism 48 acts in the same way as described above except the member 64 moves away from the bracket 66 compressing the spring thereby causing the transfer of the shock absorber fluid through the restricted opening 82. When the kinetic energy of the moving stacker is absorbed by the compression of the spring 84 and the transfer of the fluid from 88 to 86, the stacker stops. The spring then by its compression forces, forces the member 64 back towards the member 66 until the stacker stops with the member 64 in contact with both the member 66 and the limit stop 34–36.

It may thus be seen that the present invention provides a controlled deceleration positive stop means for fixed path vehicles, particularly vehicles used as stackers in automatic storage systems. By properly selecting the various elements of this disclosure, any desired rate of deceleration may be obtained for the stacker or other fixed path vehicle.

The present invention provides a self-contained double-acting shock absorber device which permits the use of one device for both directions of operation into limit stops and thus reduces the initial cost and maintenance costs of the device.

Having thus described the preferred embodiment of the present invention, it will, of course, be understood that various changes may be made in the formed details, arrangement and proportion of the parts without departing from the scope of the invention which consists of the matters shown and described herein as set forth in the appended claims.

We claim:

1. Material handling apparatus comprising:
a material transporting vehicle,
means for guiding said vehicle in a fixed path,
a first stop means located in said fixed path capable of limiting the distance of movement of said vehicle in one direction of travel,
a second stop means located in said fixed path capable of limiting the distance of movement of said vehicle in the opposite direction of travel,
a floating shock absorbing mechanism carried by said material transporting vehicle and capable of engaging said first stop means when said vehicle is travelling in one direction to decelerate said vehicle to zero velocity at a desired rate, and capable of engaging said second stop means when said vehicle is travelling in the opposite direction of travel to decelerate said vehicle to zero velocity at the same desired rate, the improvement wherein said shock absorbing mechanism comprises first movable means defining a fluid chamber second movable means including a piston in said chamber separating it into first and second cavities, resilient means biasing said piston toward a reference position, a restricted opening in said piston providing bidirectional fluid communication between said cavities, said mechanism being slidably mounted on said vehicle for sliding motion in the direction of said path, one of said first and second movable means being aligned with the stop means for either direction of travel and one said first and second means being aligned with a relatively fixed part of said vehicle for either direction of travel, whereby said vehicle is (restricted to movement between said stops and) decelerated to zero velocity (at each limit of movement) smoothly and without undue mechanical shock upon engagement of one of said first and second movable means with said stop means for either direction of travel.

2. Material handling apparatus as claimed in claim 1 in which, the means for guiding said vehicle in a fixed path includes supporting rails.

3. Material handling apparatus as claimed in claim 1 in which, said floating shock absorber mechanism consists of two shock absorbers located equidistance on opposite side of the center of mass of said material transporting vehicle normal to its direction of travel, and said first stop means consists of two stops simultaneously engaged by said two shock absorbing means when said material transporting vehicle is traveling in one direction to its limit of travel, and said second stop means consists of two stops which are engaged simultaneously by said two shock absorbing means, respectively, when said vehicle reaches its limit of operation in the opposite direction of travel, whereby said vehicle is stopped by exerting substantially equal forces on each of said shock absorbing means.

4. (Material handling apparatus as claimed in claim 1 in which:) Material handling apparatus comprising;

a material transporting vehicle, means for guiding said vehicle in a fixed path, a first stop means located in said fixed path capable of limiting the distance of movement of said vehicle in one direction of travel, a second stop means located in said fixed path capable of limiting the distance of movement of said vehicle in the opposite direction of travel, a floating shock absorbing mechanism carried by said material transporting vehicle and capable of engaging said first stop means when said vehicle is travelling in one direction to decelerate said vehicle to zero velocity at a desired rate, and capable of engaging said second stop means when said vehicle is travelling in the opposite direction of travel to decelerate said vehicle to zero velocity at the same desired rate, the improvement wherein said floating shock absorbing mechanism includes a fluid cylinder assembly, and a piston assembly in which said cylinder assembly has a cylinder head end and said piston assembly has a piston rod end, and said cylinder head end engages the first of said (stops) stop means while the piston rod end engages said vehicle in one direction of travel, and said piston rod end engages the second of said (stops) stop means while the cylinder head end engages said vehicle in the opposite direction of travel, whereby fluid is forced out of said cavity formed by said cylinder and said piston to absorb energy and thereby decelerate said vehicle.

5. Material handling apparatus as claimed in claim 4 in which each floating shock absorber assembly includes: (a cylinder assembly having a cylinder head end and a piston rod end, a piston assembly having a piston and piston rod,)

said piston fitted in said cylinder to produce a fluid cavity on each side of said piston, means for permitting restrictive flow of fluid between said cylinder head end and said piston rod end on opposite sides of said piston, whereby fluid is forced from one of said cavities to the other of said cavities by (relevant) relative movement between said material transporting vehicle and said stop means.

6. Material handling apparatus as claimed in claim 4 including:

resilient biasing means between said piston assembly and said cylinder assembly to force said piston assembly and said cylinder assembly into an extended position, whereby said piston assembly is maintained in contact with one portion of said vehicle, and said cylinder assembly is maintained in contact with another portion of said vehicle.

7. Material handling apparatus as claimed in claim 5 including:

resilient biasing means between said piston assembly and said cylinder assembly to force said piston assembly and said cylinder assembly into an extended position, whereby said piston assembly is maintained in contact with one portion of said vehicle, and said cylinder assembly is maintained in contact with another portion of said vehicle.

8. Material handling apparatus for automatic storage system comprising:

a stacker, two parallel floor mounted rails capable of supporting said stacker, (four) two pairs of stops, (two) one pair being mounted adjacent (each of) said rails and so located as to limit the travel of said stacker in one direction and another pair being mounted adjacent said rails and so located as to limit the travel of the stacker in the other direction, said stacker having four supporting wheels thereon capable of supporting said stacker on said rails, two of said wheels spaced apart on each of said rails, a floating shock absorbing device mounted in the space between each pair of wheels, the improvement wherein; said shock absorbing device comprises; first movable means defining a fluid chamber, second movable means including a piston in said chamber separating it into first and second cavities, resilient means biasing said piston toward a reference position, a restricted opening in said piston providing bidirectional fluid communication between said cavities, said device being slidably mounted on said vehicle for sliding motion in the direction of said path, one of first and second movable means being aligned with the respective stop and one of said first and second movable means being aligned with a relatively fixed part of said vehicle for either direction of travel, the first (end) movable means of each of said devices capable of engaging a first pair of said stops while the second (end) movable means of each of said devices engages said stacker to thereby stop the movement of said stacker in a first direction of movement, the said second (end) movable means of each of said devices capable of engaging a second pair of said stops while said first (end) movable means of each of said devices engages said stacker to thereby stop the movement of said stacker in a second direction of movement.

* * * * *